US010216634B2

(12) United States Patent
Huang et al.

(10) Patent No.: US 10,216,634 B2
(45) Date of Patent: Feb. 26, 2019

(54) CACHE DIRECTORY PROCESSING METHOD FOR MULTI-CORE PROCESSOR SYSTEM, AND DIRECTORY CONTROLLER

(71) Applicant: Huawei Technologies Co., Ltd., Shenzhen (CN)

(72) Inventors: Michael Huang, Rochester, NY (US); Tongtong Cao, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 28 days.

(21) Appl. No.: 15/472,724

(22) Filed: Mar. 29, 2017

(65) Prior Publication Data

US 2017/0199819 A1    Jul. 13, 2017

Related U.S. Application Data

(63) Continuation of application No. PCT/CN2014/087785, filed on Sep. 29, 2014.

(51) Int. Cl.
*G06F 12/08*  (2016.01)
*G06F 12/0817*  (2016.01)
(Continued)

(52) U.S. Cl.
CPC ........ *G06F 12/0817* (2013.01); *G06F 12/084* (2013.01); *G06F 12/0842* (2013.01); *G06F 2212/1041* (2013.01)

(58) Field of Classification Search
None
See application file for complete search history.

(56) References Cited

U.S. PATENT DOCUMENTS 5,848,434 A      12/1998  Young et al.
8,812,786 B2 *    8/2014  Beckmann ............ G06F 12/084
                                                711/128
(Continued)

FOREIGN PATENT DOCUMENTS

CN         103049392 A      4/2013
CN         103455434 A     12/2013
(Continued)

OTHER PUBLICATIONS

Machine Translation and Abstract of Chinese Publication No. CN103049392, Apr. 17, 2013, 16 pages.
(Continued)

*Primary Examiner* — Kaushikkumar M Patel
(74) *Attorney, Agent, or Firm* — Conley Rose, P.C.

(57) ABSTRACT

A cache directory processing method for a multi-core processor system, and directory controllers is presented. The method includes obtaining a first directory entry corresponding to first-type storage space in shared storage space of the multi-core processor system and in a directory of the shared storage space; performing a directory entry combination operation on the first directory entry according to each directory entry in the first directory entry and according to an access type and a sharer, to form a second directory entry of the first-type storage space; and when a record quantity of the second directory entry is less than a record quantity of the first directory entry, replacing the first directory entry with the second directory entry, and using the second directory entry as a directory entry corresponding to the first-type storage space and in the directory of the shared storage space.

18 Claims, 4 Drawing Sheets

(51) Int. Cl.
*G06F 12/084* (2016.01)
*G06F 12/0842* (2016.01)

(56) References Cited

U.S. PATENT DOCUMENTS

| | | | |
|---|---|---|---|
| 2004/0030841 A1 | 2/2004 | Nanda et al. | |
| 2011/0138128 A1* | 6/2011 | Chen | G06F 12/0817 711/130 |
| 2015/0143050 A1* | 5/2015 | Rowlands | G06F 12/084 711/128 |
| 2015/0286577 A1* | 10/2015 | Solihin | G06F 12/0813 711/122 |
| 2016/0342516 A1* | 11/2016 | Chang | G06F 12/0815 |

FOREIGN PATENT DOCUMENTS

| | | | |
|---|---|---|---|
| CN | 103729309 A | 4/2014 | |
| CN | 103970678 A | 8/2014 | |

OTHER PUBLICATIONS

Machine Translation and Abstract of Chinese Publication No. CN103455434, Dec. 18, 2013, 36 pages.
Machine Translation and Abstract of Chinese Publication No. CN103729309, Apr. 16, 2014, 8 pages.
Machine Translation and Abstract of Chinese Publication No. CN103970678, Aug. 6, 2014, 25 pages.
Fang, L, et al., Building Expressive, Area-Efficient Coherence Directories, Proceedings of the 22nd International Conference on Parallel architectures and Compilation Techniques, Oct. 7, 2013, pp. 299-308.
Cuesta, B., et al., "Increasing the Effectiveness of Directory Caches by Deactivating Coherence for Private Memory Blocks," 38th Annual International Symposium on Computer Architecture, Jun. 4-8, 2011, pp. 93-103.
Alisafaee, M., "Spatiotemporal Coherence Tracking," IEEE/ACM 45th Annual International Symposium on Microarchitecture, Dec. 1-5, 2012, pp. 341-350.
Foreign Communication From a Counterpart Application, PCT Application No. PCT/CN2014/087785, English Translation of International Search Report dated Jun. 19, 2015, 2 pages.
Foreign Communication From a Counterpart Application, PCT Application No. PCT/CN2014/087785, English Translation of Written Opinion dated Jun. 19, 2015, 8 pages.

\* cited by examiner

| Interval directory entry | Address label | Sharer list | Granularity mark | Type mark | |
|---|---|---|---|---|---|
| Line directory entry | Address label | Sharer list | Granularity mark | Type mark | Offset |

FIG. 3

| Interval directory entry | Address label | Sharer list | Granularity mark | |
|---|---|---|---|---|
| Line directory entry | Address label | Sharer list | Granularity mark | Offset |

FIG. 4

| High-order interval directory entry | Address label | Sharer list | Granularity mark | Type mark | |
|---|---|---|---|---|---|
| Interval directory entry | Address label | Sharer list | Granularity mark | Type mark | Offset |
| Line directory entry | Address label | Sharer list | Granularity mark | Type mark | Offset |

FIG. 5

CACHE DIRECTORY PROCESSING METHOD FOR MULTI-CORE PROCESSOR SYSTEM, AND DIRECTORY CONTROLLER

CROSS-REFERENCE TO RELATED APPLICATIONS

This application is a continuation of International Application No. PCT/CN2014/087785, filed on Sep. 29, 2014, the disclosure of which is hereby incorporated by reference in its entirety.

TECHNICAL FIELD

The present disclosure relates to the computer field, and more specifically, to a cache directory processing method for a multi-core processor system, and a directory controller.

BACKGROUND

A multi-core processor is a central processing unit (CPU) formed by integrating multiple processor cores on a single processor chip. An independent-entity central processing unit is also referred to as a processor core, a kernel, or a core and is the most important constituent part of the CPU. The processor core performs all computation, command receiving/storage, and data processing of the CPU. Each type of CPU processor core has a fixed logical structure that includes a level 1 cache, a level 2 cache, an execution unit, an instruction-level unit, a bus interface, and the like.

A processor is a core part of a computer system. As an application program has an ever-increasing requirement for a capability of processing high-throughput data, a conventional solution for improving performance of a single-core processor is limited by an integration level, power consumption, and a delay. Currently, an on-chip multi-core solution of replacing a single complex core with multiple simple cores is generally used in the industry. A physical memory needs to be shared by multiple processor cores, and each processor core has its own private cache. Therefore, when accessing the shared physical memory, a processor core generally needs to copy a data block from the shared physical memory to its own private cache, so as to accelerate data access. When multiple processor cores access the shared physical memory, a copy of the data block in the shared physical memory exists in private caches of the multiple processor cores. Therefore, a cache coherence protocol is required to manage data sharing, so as to maintain coherence of the copies. When performing a write operation on a shared data block or a copy of the shared data block, a processor core may send a write invalidate operation or a write update operation to a processor core that stores a copy of the shared data block, so as to avoid a data incoherence problem. Cache coherence may be maintained by recording a cache status of a data block (or a data block interval). The cache status of the data block (or the data block interval) may include an access type and a sharer of the data block (or the data block interval).

Currently, there are mainly two cache coherence protocols: a bus-snooping based coherence protocol, and a directory structure-based coherence protocol. In the directory structure-based coherence protocol, a fetch demand of a single processor core is first sent to a directory structure that has an accessed cache block, and the directory structure records a sharing status of the cache block. A write invalidate operation or a write update operation is sent to only a processor core recorded in the directory structure, thereby avoiding unnecessary bandwidth overheads. For the directory structure-based coherence protocol, because the directory structure also occupies on-chip storage space, important research content is to reduce storage overheads of the directory structure.

In a prior art of the present disclosure, data blocks of a specific quantity are grouped into several data block intervals. Each data block interval includes multiple data blocks, a shared interval directory entry is used to indicate a cache status of the data block interval, and one or more line directory entries are used as a supplementary. One line directory entry in an interval directory entry is corresponding to one data block in a data block interval corresponding to the interval directory entry, and is used to indicate a cache status of the data block. A cache status of the line directory entry is different from a cache status of the interval directory entry. If a write operation is frequently performed on multiple data blocks in an interval, multiple line directory entries are generated, which leads to an extremely large total quantity of directory entries, such that storage overheads occupied by the directory entries cannot be reduced.

In another prior art of the present disclosure, data blocks of a specific quantity are grouped into several data block intervals. Each data block interval includes multiple data blocks, a private interval directory entry is used to indicate a cache status of the data block interval, and one or more line directory entries are used as a supplementary. One line directory entry in an interval directory entry is corresponding to one data block in a data block interval corresponding to the interval directory entry, and is used to indicate a cache status of the data block. A cache status of the line directory entry is different from a cache status of the interval directory entry. If another processor node frequently performs a read or write operation on multiple data blocks in an interval, multiple line directory entries are generated, which also increases a total quantity of directory entries and storage overheads of the directory entries.

A technical solution is required to correctly indicate a sharing status of a data block and improve utilization of on-chip storage space of a directory.

SUMMARY

Embodiments of the present disclosure provide a cache directory processing method for a multi-core processor system, and a directory controller, so as to improve utilization of on-chip storage space of a directory to some extent while a sharing status of a data block is correctly indicated.

According to a first aspect, a cache directory processing method for a multi-core processor system is provided. The method includes obtaining a first directory entry that is corresponding to first-type storage space in shared storage space of the multi-core processor system and that is in a directory of the shared storage space, where the first-type storage space includes multiple second-type storage spaces, and the first directory entry includes a second-type directory entry or includes a second-type directory entry and a first-type directory entry, where the first-type directory entry is used to describe an access type and a sharer of the first-type storage space corresponding to the first-type directory entry, the second-type directory entry is used to describe an access type and a sharer of the second-type storage space corresponding to the second-type directory entry, one first-type directory entry is one directory entry record in the directory of the shared storage space, and one second-type directory entry is one directory entry record in the directory of the shared storage space; performing a directory entry combination operation on the first directory entry according to each directory entry in the first directory entry and according to an access type and a sharer, to form a second directory entry of the first-type storage space; and when a record quantity of the second directory entry is less than a record quantity of the first directory entry, replacing the first directory entry with the second directory entry, and using the second directory entry as a directory entry that is corresponding to the first-type storage space and that is in the directory of the shared storage space.

With reference to the first aspect, in a first possible implementation manner, the performing a directory entry combination operation on the first directory entry according to each directory entry in the first directory entry and according to an access type and a sharer, to form a second directory entry of the first-type storage space is further implemented as combining multiple second-type directory entries in the first directory entry according to the first-type directory entry in the first directory entry and the second-type directory entry in the first directory entry, to form a first-type directory entry in the second directory entry, and forming a second-type directory entry in the second directory entry according to the first-type directory entry in the first directory entry, the second-type directory entry in the first directory entry, and the first-type directory entry in the second directory entry, where access types described by the multiple second-type directory entries in the first directory entry are all a sharing type, an access type described by the first-type directory entry in the second directory entry is a sharing type, and sharers described by the first-type directory entry in the second directory entry are sharers to which the multiple second-type directory entries in the first directory entry relate.

With reference to the first aspect, in a second possible implementation manner, the performing a directory entry combination operation on the first directory entry according to each directory entry in the first directory entry and according to an access type and a sharer, to form a second directory entry of the first-type storage space is further implemented as combining multiple second-type directory entries in the first directory entry according to the first-type directory entry in the first directory entry and the second-type directory entry in the first directory entry, to form a first-type directory entry in the second directory entry, and forming a second-type directory entry in the second directory entry according to the first-type directory entry in the first directory entry, the second-type directory entry in the first directory entry, and the first-type directory entry in the second directory entry, where access types described by the multiple second-type directory entries in the first directory entry are all a private type and the multiple second-type directory entries have a same sharer, an access type described by the first-type directory entry in the second directory entry is a private type, and a sharer described by the first-type directory entry in the second directory entry is the sharer of the multiple second-type directory entries in the first directory entry.

With reference to the first aspect, in a third possible implementation manner, the first-type storage space includes multiple third-type storage spaces, the third-type storage space includes multiple second-type storage spaces, the first directory entry further includes a third-type directory entry, and the third-type directory entry is used to describe an access type and a sharer of the third-type storage space corresponding to the third-type directory entry; and the performing a directory entry combination operation on the first directory entry according to each directory entry in the first directory entry and according to an access type and a sharer, to form a second directory entry of the first-type storage space is further implemented as performing a directory entry combination operation on the second-type directory entry in the first directory entry according to the second-type directory entry in the first directory entry and the third-type directory entry in the first directory entry and according to an access type and a sharer, to form a third directory entry of the first-type storage space; and performing a combination operation on a third-type directory entry in the third directory entry according to the third-type directory entry in the third directory entry and a first-type directory entry in the third directory entry and according to an access type and a sharer, to form the second directory entry of the first-type storage space.

With reference to the first aspect, in a fourth possible implementation manner, the first-type storage space includes multiple third-type storage spaces, the third-type storage space includes multiple second-type storage spaces, the first directory entry further includes a third-type directory entry, and the third-type directory entry is used to describe an access type and a sharer of the third-type storage space corresponding to the third-type directory entry; and the performing a directory entry combination operation on the first directory entry according to each directory entry in the first directory entry and according to an access type and a sharer, to form a second directory entry of the first-type storage space is further implemented as performing a directory entry combination operation on the third-type directory entry in the first directory entry according to the third-type directory entry in the first directory entry and the first-type directory entry in the first directory entry and according to an access type and a sharer, to form a third directory entry of the first-type storage space; and performing a directory entry combination operation on a second-type directory entry in the third directory entry according to the second-type directory entry in the third directory entry and a third-type directory entry in the third directory entry and according to an access type and a sharer, to form the second directory entry of the first-type storage space.

With reference to any one of the first aspect, or the first possible implementation manner of the first aspect to the fourth possible implementation manner of the first aspect, in a fifth possible implementation manner, a same data structure is used for directory entries of different types in the directory of the shared storage space, and granularity marks are used to distinguish the directory entries of different types.

With reference to any one of the first aspect, or the first possible implementation manner of the first aspect to the fifth possible implementation manner of the first aspect, in a sixth possible implementation manner, the second-type storage space is a data block, the data block is a minimum storage space division unit, and the second-type directory entry is a line directory entry and is used to describe an access type and a sharer of a data block corresponding to the line directory entry.

According to a second aspect, a directory controller is provided and is applied to a multi-core processor system. The directory controller includes an obtaining unit configured to obtain a first directory entry that is corresponding to first-type storage space in shared storage space of the multi-core processor system and that is in a directory of the shared storage space, where the first-type storage space includes multiple second-type storage spaces, and the first directory entry includes a second-type directory entry or includes a second-type directory entry and a first-type directory entry, where the first-type directory entry is used to describe an access type and a sharer of the first-type storage space corresponding to the first-type directory entry, the second-type directory entry is used to describe an access type and a sharer of the second-type storage space corresponding to the second-type directory entry, one first-type directory entry is one directory entry record in the directory of the shared storage space, and one second-type directory entry is one directory entry record in the directory of the shared storage space; a combination unit configured to perform a directory entry combination operation on the first directory entry according to each directory entry in the first directory entry and according to an access type and a sharer, to form a second directory entry of the first-type storage space; and a replacement unit configured to, when a record quantity of the second directory entry is less than a record quantity of the first directory entry, replace the first directory entry with the second directory entry, and use the second directory entry as a directory entry that is corresponding to the first-type storage space and that is in the directory of the shared storage space.

With reference to the second aspect, in a first possible implementation manner, the combination unit is further configured to combine multiple second-type directory entries in the first directory entry according to the first-type directory entry in the first directory entry and the second-type directory entry in the first directory entry, to form a first-type directory entry in the second directory entry; and form a second-type directory entry in the second directory entry according to the first-type directory entry in the first directory entry, the second-type directory entry in the first directory entry, and the first-type directory entry in the second directory entry, where access types described by the multiple second-type directory entries in the first directory entry are all a sharing type, an access type described by the first-type directory entry in the second directory entry is a sharing type, and sharers described by the first-type directory entry in the second directory entry are sharers to which the multiple second-type directory entries in the first directory entry relate.

With reference to the second aspect, in a second possible implementation manner, the combination unit is further configured to combine multiple second-type directory entries in the first directory entry according to the first-type directory entry in the first directory entry and the second-type directory entry in the first directory entry, to form a first-type directory entry in the second directory entry; and form a second-type directory entry in the second directory entry according to the first-type directory entry in the first directory entry, the second-type directory entry in the first directory entry, and the first-type directory entry in the second directory entry, where access types described by the multiple second-type directory entries in the first directory entry are all a private type and the multiple second-type directory entries have a same sharer, an access type described by the first-type directory entry in the second directory entry is a private type, and a sharer described by the first-type directory entry in the second directory entry is the sharer of the multiple second-type directory entries in the first directory entry.

With reference to the second aspect, in a third possible implementation manner, the first-type storage space can be divided into multiple third-type storage spaces, the third-type storage space can be divided into multiple second-type storage spaces, the first directory entry further includes a third-type directory entry, and the third-type directory entry is used to describe an access type and a sharer of the third-type storage space corresponding to the third-type directory entry; and the combination unit is further configured to perform a directory entry combination operation on the second-type directory entry in the first directory entry according to the second-type directory entry in the first directory entry and the third-type directory entry in the first directory entry and according to an access type and a sharer, to form a third directory entry of the first-type storage space; and perform a combination operation on a third-type directory entry in the third directory entry according to the third-type directory entry in the third directory entry and a first-type directory entry in the third directory entry and according to an access type and a sharer, to form the second directory entry of the first-type storage space.

With reference to the second aspect, in a fourth possible implementation manner, the first-type storage space can be divided into multiple third-type storage spaces, the third-type storage space can be divided into multiple second-type storage spaces, the first directory entry further includes a third-type directory entry, and the third-type directory entry is used to describe an access type and a sharer of the third-type storage space corresponding to the third-type directory entry; and the combination unit is further configured to perform a directory entry combination operation on the third-type directory entry in the first directory entry according to the third-type directory entry in the first directory entry and the first-type directory entry in the first directory entry and according to an access type and a sharer, to form a third directory entry of the first-type storage space; and perform a directory entry combination operation on a second-type directory entry in the third directory entry according to the second-type directory entry in the third directory entry and a third-type directory entry in the third directory entry and according to an access type and a sharer, to form the second directory entry of the first-type storage space.

With reference to any one of the second aspect, or the first possible implementation manner of the second aspect to the fourth possible implementation manner of the second aspect, in a fifth possible implementation manner, a same data structure is used for directory entries of different types in the directory of the shared storage space, and granularity marks are used to distinguish the directory entries of different types.

With reference to any one of the second aspect, or the first possible implementation manner of the second aspect to the fifth possible implementation manner of the second aspect, in a sixth possible implementation manner, the second-type storage space is a data block, the data block is a minimum storage space division unit, and the second-type directory entry is a line directory entry and is used to describe an access type and a sharer of a data block corresponding to the line directory entry.

According to the cache directory processing method and the directory controller in the embodiments of the present disclosure, directory entries of one or more data block intervals are combined according to an access type and a sharer, and a directory entry with relatively low directory storage overheads is selected as a directory entry of the one or more data block intervals. Therefore, utilization of on-chip storage space of a directory can be improved to some extent while a sharing status of a data block is correctly indicated.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and persons of ordinary skill in the art may still derive other drawings from these accompanying drawings without creative efforts.

FIG. 3 is a schematic diagram of data structures of a line directory entry and an interval directory entry according to an embodiment of the present disclosure;

FIG. 4 is another schematic diagram of data structures of a line directory entry and an interval directory entry according to an embodiment of the present disclosure;

FIG. 5 is a schematic diagram of data structures of a line directory entry, an interval directory entry, and a high-order interval directory entry according to an embodiment of the present disclosure;

DESCRIPTION OF EMBODIMENTS

Figure 1:
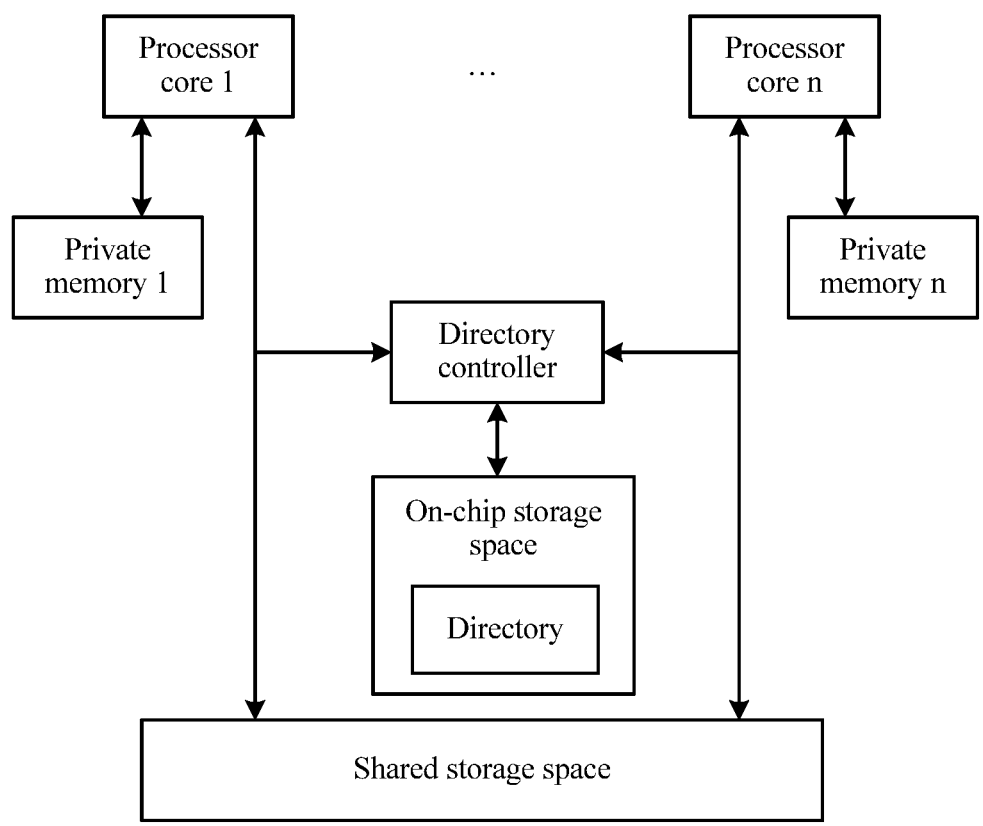
FIG. 1 is a schematic structural diagram of a multi-core processor system according to an embodiment of the present disclosure.

The following clearly describes the technical solutions in the embodiments of the present disclosure with reference to the accompanying drawings in the embodiments of the present disclosure. The described embodiments are some but not all of the embodiments of the present disclosure. All other embodiments obtained by persons of ordinary skill in the art based on the embodiments of the present disclosure without creative efforts shall fall within the protection scope of the present disclosure.

The technical solutions of the present disclosure may be applied to various multi-core processor systems, and are specifically used to maintain cache status coherence of the multi-core processor system.

To facilitate understanding of the embodiments of the present disclosure, some elements used in description of the embodiments of the present disclosure are first described herein.

Cache status: A cache status includes an access type and a sharer. An access type of a data block (or a data block interval) may include a sharing type and a private type. The sharing type means that the data block (or the data block interval) is shared by multiple sharers. The private type means that the data block (or the data block interval) is monopolized by one sharer. A sharer of the data block (or the data block interval) is a processor core that currently accesses the data block (or the data block interval).

Line directory entry: In a multi-core processor system, a directory entry is used to record a cache status of a data block in a shared memory, and a directory entry that describes a cache status of a data block is referred to as a line directory entry. The line directory entry may record an access type and a sharer of the data block. For example, in a data structure of a line directory entry shown in FIG. 3, FIG. 4, or FIG. 5, a type mark field may be used to record an access type of a data block, and a sharer list field may be used to record a sharer of a data block. One line directory entry is corresponding to one data block.

Interval directory entry: To reduce a quantity of directory entries, multiple consecutive data blocks are grouped into one data block interval, and a directory entry that describes a cache status of the data block interval is referred to as an interval directory entry. The interval directory entry may record an access type and a sharer of the data block interval. For example, in a data structure of an interval directory entry shown in FIG. 3, FIG. 4, or FIG. 5, a type mark field may be used to record an access type of a data block interval, and a sharer list field may be used to record a sharer of a data block interval. One interval directory entry is corresponding to one data block interval. When a data block interval in which a data block is located has a corresponding interval directory entry, and the data block has a corresponding line directory entry, a cache status of the data block is a cache status recorded in the line directory entry.

High-order interval directory entry: Multiple consecutive data block intervals are grouped into one high-order data block interval, and a directory entry that describes a cache status of the high-order data block interval is referred to as a high-order interval directory entry. The high-order interval directory entry may record an access type and a sharer of the high-order data block interval. For example, in a data structure of a high-order interval directory entry shown in FIG. 5, a type mark field may be used to record an access type of a high-order data block interval, and a sharer list field may be used to record a sharer of a high-order data block interval. One high-order interval directory entry is corresponding to one high-order data block interval. When a data block has a corresponding line directory entry, regardless of whether a data block interval or a high-order data block interval in which the data block is located has a corresponding directory entry, a cache status of the data block is a cache status recorded in the line directory entry. Certainly, there may further be a data block interval of a larger granularity than the high-order data block interval, and the data block interval of a larger granularity may also have a corresponding higher-order interval directory entry.

Directory entry granularity: A directory entry granularity is used to indicate a quantity of data blocks corresponding to a directory entry. For example, 0 is used to indicate that a granularity of a directory entry is a data block, that is, the directory entry is used to describe a cache status of a data block. For another example, 1 is used to indicate that a granularity of a directory entry is a data block interval, that is, the directory entry is used to describe a cache status of a data block interval. Further, different granularities may be used to indicate data block intervals of different sizes.

Sharer: A sharer is an object that accesses a data block or a data block interval, and is a processor core in the embodiments of the present disclosure.

The method and the directory controller in the embodiments of the present disclosure are applicable to a multi-core processor system. The multi-core processor system may include multiple processor cores, a private memory of each processor core, a directory controller, on-chip storage space, and shared storage space. The on-chip storage space stores a directory of the shared storage space, and the directory is used to record a status of caching a data block in the shared storage space by the processor core in the multi-core processor system. FIG. 1 is a schematic structural diagram of a multi-core processor system according to an embodiment of the present disclosure. As shown in FIG. 1, a multi-core processor system may include n processor cores (a processor core 1, . . . , a processor core n) and private memories (a private memory 1, . . . , a private memory n) of all the processor cores. In addition, the multi-core processor system may further include shared storage space, and the shared storage space is shared by the n processor cores. In addition, the multi-core processor system may further include on-chip storage space that stores a directory of the shared storage space. A directory entry in the directory records a status of caching a data block in the shared storage space by the processor core. When accessing a data block in the shared storage space, a processor core reads a directory entry corresponding to the data block from the directory of the on-chip storage space using a directory controller, and writes, using the directory controller, a cache status of the data block after the data block is accessed into the directory entry corresponding to the data block. Certainly, it should be understood that the multi-core processor system may further include a memory controller (or a cache controller) that is used to receive a fetch request of the processor core. Access to the shared storage space by the processor core needs to be performed using the memory controller. In actual application, the directory controller and the memory controller may be integrated as one device, or the memory controller can complete work of the directory controller, and the memory controller directly performs a read or write operation on a directory.

Figure 2:
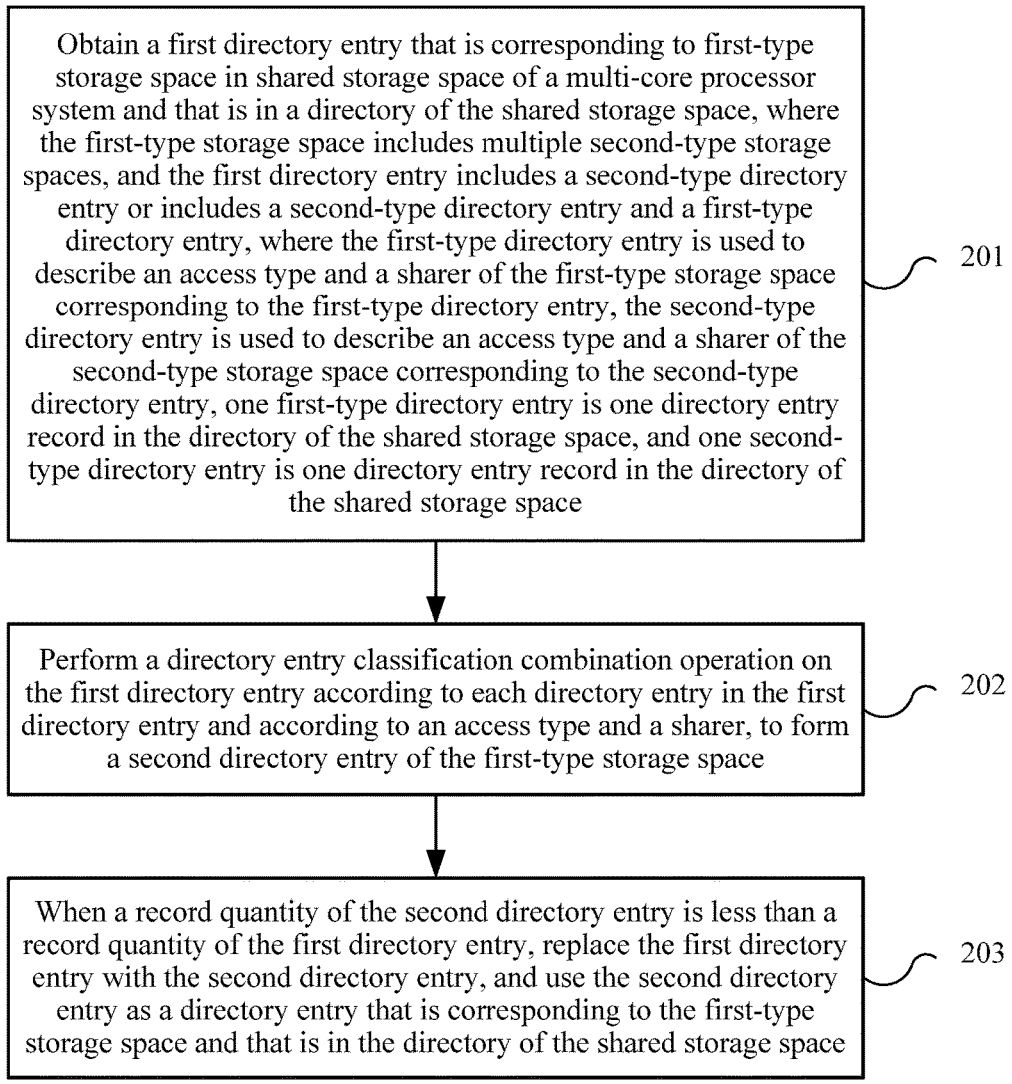
FIG. 2 is a flowchart of a cache directory processing method for a multi-core processor system according to an embodiment of the present disclosure.

FIG. 2 is a flowchart of a cache directory processing method for a multi-core processor system according to an embodiment of the present disclosure. The method in FIG. 2 is performed by a directory controller in a multi-core processor system.

201. Obtain a first directory entry that is corresponding to first-type storage space in shared storage space of the multi-core processor system and that is in a directory of the shared storage space.

The first-type storage space can be divided into multiple second-type storage spaces, and the first directory entry includes a first-type directory entry and/or a second-type directory entry. The first-type directory entry is used to describe an access type and a sharer of the first-type storage space corresponding to the first-type directory entry, and the second-type directory entry is used to describe an access type and a sharer of the second-type storage space corresponding to the second-type directory entry. One first-type directory entry is one directory entry record in the directory of the shared storage space, and one second-type directory entry is one directory entry record in the directory of the shared storage space.

It should be understood that the shared storage space in this embodiment of the present disclosure is storage space shared by multiple processor cores in the multi-core processor system, and, may be a cache in the multi-core processor system.

It should be understood that, in this embodiment of the present disclosure, both the first-type storage space and the second-type storage space are a type of granularity space that is used to divide the shared storage space in the multi-core processor system. The first-type storage space includes multiple consecutive second-type storage spaces, and all first-type storage spaces have second-type storage space of a same quantity. In this embodiment of the present disclosure, a data block is space, obtained after the shared storage space is divided, of a minimum granularity.

It should be understood that when a second-type storage space has both the first-type directory entry and the second-type directory entry, the second-type directory entry corresponding to the second-type storage space is used to describe an access type and a sharer of the second-type storage space. It should be understood that, that a second-type storage space has both the first-type directory entry and the second-type directory entry means that in the directory of the shared storage space, there are both the second-type directory entry corresponding to the second-type storage space and the first-type directory entry corresponding to the first-type storage space in which the second-type storage space is located. For example, it is assumed that a data block interval A has an interval directory entry B in the directory of the shared storage space, and a data block C in the data block interval A has a line directory entry D in the directory of the shared storage space, the data block C has both the interval directory entry B and the line directory entry D. In this case, a cache status (an access type and a sharer) of the data block C is a cache status (an access type and a sharer) described by the line directory entry D.

It should be understood that a sharer of storage space is a processor core that is in the multi-core processor system and that accesses the storage space.

It should be understood that an access type of the storage space includes a sharing type and a private type. The sharing type means that the storage space is simultaneously accessed by multiple sharers, and the private type means that the storage space is accessed by a single sharer.

When the first-type directory entry or the second-type directory entry is used to indicate the access type of the storage space, a single field may be used to for indication, for example, a "type mark" field is created in a directory entry, where 0 is used to indicate the private type and 1 is used to indicate the sharing type; or the access type is implicitly indicated according to a quantity of sharers described in the directory entry, for example, when the quantity of sharers is 1, it indicates the private type, and when the quantity of sharers is greater than 1, it indicates the sharing type.

202. Perform a directory entry combination operation on the first directory entry according to each directory entry in the first directory entry and according to an access type and a sharer, to form a second directory entry of the first-type storage space.

203. When a record quantity of the second directory entry is less than a record quantity of the first directory entry, replace the first directory entry with the second directory entry, and use the second directory entry as a directory entry that is corresponding to the first-type storage space and that is in the directory of the shared storage space, where one first-type directory entry is one record and one second-type directory entry is one record.

In this embodiment of the present disclosure, directory entries of a data block interval are combined according to an access type and a sharer, and when a record quantity of directory entries obtained after the combination is less than a record quantity of the directory entries before the combination, the directory entries before the combination are replaced with the directory entries obtained after the combination. Therefore, utilization of on-chip storage space of a directory can be improved to some extent while a sharing status of a data block is correctly indicated.

It should be understood that, in this embodiment of the present disclosure, the first-type storage space is corresponding to the first-type directory entry, and the second-type storage space is corresponding to the second-type directory entry. The only difference between the first-type storage space and the second-type storage space is a difference in storage space sizes, and one first-type storage space may be divided into multiple second-type storage spaces. For example, in this embodiment of the present disclosure, the first-type storage space may be a data block interval that may include multiple consecutive data blocks, and the second-type storage space may be a data block. In this case, the first-type directory entry is an interval directory entry and the second-type directory entry is a line directory entry. The data block is minimum storage space accessed by a processor core.

FIG. 3 is a schematic diagram of data structures of a line directory entry and an interval directory entry according to an embodiment of the present disclosure. In an embodiment of the present disclosure, the data structures of a line directory entry and an interval directory entry are shown in FIG. 3. The interval directory entry may include an address label, a sharer list, a granularity mark, and a type mark. The line directory entry may include an address label, a sharer list, a granularity mark, a type mark, and an offset.

In the interval directory entry, the address label is used to mark an address of the first data block in a data block interval corresponding to the directory entry; the sharer list is used to record a sharer of the data block interval corresponding to the directory entry; the granularity mark is used to identify a granularity of the directory entry, for example, 0 indicates a line directory entry, and 1 indicates an interval directory entry, and in this case, the granularity mark is 1; the type mark is used to identify a type of the directory entry, for example, 0 indicates a private type and 1 indicates a sharing type. It should be understood that when the type mark of the interval directory entry is the sharing type, there may be multiple sharers in the sharer list of the interval directory entry.

In the line directory entry, the address label is used to indicate an address of the first data block in a data block interval corresponding to the line directory entry; the sharer list is used to record a sharer of a data block corresponding to the directory entry; the granularity mark is used to identify a granularity of the directory entry, for example, 0 indicates a line directory entry, and 1 indicates an interval directory entry, and in this case, the granularity mark is 0; the offset is used to record an offset that is of an address of the data block corresponding to the line directory entry and that is relative to the address recorded in the address label.

FIG. 4 is another schematic diagram of data structures of a line directory entry and an interval directory entry according to an embodiment of the present disclosure. In an embodiment of the present disclosure, the data structures of a line directory entry and an interval directory entry are shown in FIG. 4. The interval directory entry may include an address label, a sharer list, and a granularity mark. The line directory entry may include an address label, a sharer list, a granularity mark, and an offset. Meanings indicated by the address label, the sharer list, and the granularity mark of the interval directory entry, and the address label, the sharer list, the granularity mark, and the offset of the line directory entry are similar to those in FIG. 3, and are not described herein again in this embodiment of the present disclosure. In addition, in the interval directory entry, a type mark may be determined according to a quantity of sharers in the sharer list of the interval directory entry. If the quantity of sharers is 1, a type of the directory entry is a private type; if the quantity of sharers is greater than 1, a type of the directory entry is a sharing type. Similarly, in the line directory entry, a type mark may also be determined according to a quantity of sharers in the sharer list of the line directory entry.

Preferably, a same data structure is used for directory entries of different types in the directory of the shared storage space, and granularity marks are used to distinguish the directory entries of different types. For example, a same data structure may be used for the first-type directory entry and the second-type directory entry, and granularity marks are used to identify directory entries of different types, or a granularity mark is used to identify a size of storage space described by a directory entry. The interval directory entry and the line directory entry are used as an example. In the data structures shown in FIG. 3 or FIG. 4, the data structures of the line directory entry and the interval directory entry may each include an offset, and the offset of the interval directory entry is 0. Alternatively, neither of the data structures of the line directory entry and the interval directory entry includes an offset. The address label of the line directory entry indicates an address of a data block corresponding to the line directory entry, and the address label of the interval directory entry indicates an address of the first data block in a data block interval corresponding to the interval directory entry. Management of the directory entries in the directory of the shared storage space may be more convenient and efficient by unifying the data structures of the directory entries.

Optionally, in an embodiment, step 202 is further implemented as combining multiple second-type directory entries in the first directory entry according to the first-type directory entry in the first directory entry and the second-type directory entry in the first directory entry, to form a first-type directory entry in the second directory entry, and forming a second-type directory entry in the second directory entry according to the first-type directory entry in the first directory entry, the second-type directory entry in the first directory entry, and the first-type directory entry in the second directory entry, where access types described by the multiple second-type directory entries in the first directory entry are all a sharing type, an access type described by the first-type directory entry in the second directory entry is a sharing type, and sharers described by the first-type directory entry in the second directory entry are sharers to which the multiple second-type directory entries in the first directory entry relate.

For example, it is assumed that in the shared storage space, a data block interval 0 may include four data blocks, that is, a data block 0 to a data block 3. In the directory of the shared storage space, a data block interval 0 is corresponding to an interval directory entry 1, sharers of the interval directory entry 0 are a processor core 1 and a processor core 2, and an access type of the interval directory entry 1 is the sharing type; the data block 1 is corresponding to a line directory entry 1, sharers of the line directory entry 1 are a processor core 3 and a processor core 4, and an access type of the line directory entry 1 is the sharing type; the data block 2 is corresponding to a line directory entry 2, sharers of the line directory entry 2 are the processor core 3 and a processor core 5, and an access type of the line directory entry 2 is the sharing type; the data block 3 is corresponding to a line directory entry 3, sharers of the line directory entry 3 are the processor core 4 and the processor core 5, and an access type of the line directory entry 3 is the sharing type. In this case, the line directory entry 1, the line directory entry 2, and the line directory entry 3 may be combined according to the interval directory entry 1, the line directory entry 1, the line directory entry 2, and the line directory entry 3, to form an interval directory entry 2 whose access type is the sharing type and sharers are the processor core 3, the processor core 4, and the processor core 5. In addition, a line directory entry 4 of the data block 0 may also be generated according to the interval directory entry 1, the line directory entry 1, the line directory entry 2, the line directory entry 3, and the interval directory entry 2, where sharers of the line directory entry 4 are the processor core 1 and the processor core 2 and an access type of the line directory entry 4 is the sharing type. The interval directory entry 2 and the line directory entry 4 jointly constitute new directory entries that describe the data block interval 0. In this case, a record quantity of the directory entries constituted by the interval directory entry 2 and the line directory entry 4 is 2, and a record quantity of original directory entries of the data block interval 0 is 4. The original directory entries of the data block interval 0 may be replaced with the directory entries constituted by the interval directory entry 2 and the line directory entry 4, to reduce overheads of on-chip directory storage space.

Optionally, in another embodiment, step 202 is further implemented as combining multiple second-type directory entries in the first directory entry according to the first-type directory entry in the first directory entry and the second-type directory entry in the first directory entry, to form a first-type directory entry in the second directory entry, and forming a second-type directory entry in the second directory entry according to the first-type directory entry in the first directory entry, the second-type directory entry in the first directory entry, and the first-type directory entry in the second directory entry, where access types described by the multiple second-type directory entries in the first directory entry are all a private type and the multiple second-type directory entries have a same sharer, an access type described by the first-type directory entry in the second directory entry is a private type, and a sharer described by the first-type directory entry in the second directory entry is the sharer of the multiple second-type directory entries in the first directory entry.

For example, it is assumed that in the shared storage space, a data block interval 1 may include four data blocks, that is, a data block 4 to a data block 7. In the directory of the shared storage space, the data block interval 1 is corresponding to an interval directory entry 3, a sharer of the interval directory entry 3 is a processor core 6, and an access type of the interval directory entry 3 is the private type; the data block 5 is corresponding to a line directory entry 6, a sharer of the line directory entry 6 is a processor core 7, and an access type of the line directory entry 6 is the private type; the data block 6 is corresponding to a line directory entry 7, a sharer of the line directory entry 7 is the processor core 7, and an access type of the line directory entry 7 is the private type; the data block 7 is corresponding to a line directory entry 8, a sharer of the line directory entry 8 is a processor core 8, and an access type of the line directory entry 8 is the private type. In this case, the line directory entry 6 and the line directory entry 7 may be combined according to the interval directory entry 3, the line directory entry 6, the line directory entry 7, and the line directory entry 8, to form an interval directory entry 4 whose access type is the private type and sharer is the processor core 7. In addition, a line directory entry 9 of the data block 4 and a line directory entry 10 of the data block 7 may also be generated according to the interval directory entry 3, the line directory entry 6, the line directory entry 7, the line directory entry 8, and the interval directory entry 4, where an access type of the line directory entry 9 is the private type and a sharer of the line directory entry 9 is the processor core 6, and a sharer of the line directory entry 10 is the processor core 8 and an access type of the line directory entry 10 is the private type. The interval directory entry 4, the line directory entry 9, and the line directory entry 10 jointly constitute new directory entries that describe the data block interval 1. In this case, a record quantity of the directory entries constituted by the interval directory entry 4, the line directory entry 9, and the line directory entry 10 is 3, and a record quantity of the original directory entries of the data block interval 1 is 4. The original directory entries of the data block interval 1 may be replaced with the directory entries constituted by the interval directory entry 4, the line directory entry 9, and the line directory entry 10, to reduce overheads of on-chip directory storage space.

In addition, it should be understood that, in directory entries of a data block interval, an access type of an interval directory entry may be the same as or different from that of a line directory entry. In the foregoing embodiments of the present disclosure, only a scenario in which the access type of the interval directory entry is the same as that of the line directory entry is shown, but the method in this embodiment of the present disclosure may also be applied to a scenario in which the access type of the interval directory entry is different from that of the line directory entry.

Optionally, the first-type storage space includes multiple third-type storage spaces, the third-type storage space includes multiple second-type storage spaces, the first directory entry further includes a third-type directory entry, and the third-type directory entry is used to describe an access type and a sharer of the third-type storage space corresponding to the third-type directory entry.

It should be understood that, in this embodiment of the present disclosure, all first-type storage spaces include third-type storage space of a same quantity, and all third-type storage spaces include second-type storage space of a same quantity.

When a second-type storage space has the first-type directory entry, the second-type directory entry, and the third-type directory entry, the second-type directory entry corresponding to the second-type storage space is used to describe an access type and a sharer of the second-type storage space. That is, when a storage space has multiple directory entries, a directory entry of minimum granularity space is used to describe an access type and a sharer of the storage space.

When there are storage space of multiple levels and directory entries of multiple levels in the shared storage space, if a data block has directory entries of multiple types, a directory entry whose granularity mark indicates minimum space is used to describe an access type and a sharer of the data block. For example, in the shared storage space, relationships between a data block interval S1, a data block interval S2, a data block interval S3, and a data block S4 are as follows: the data block interval S1 includes multiple data block intervals whose sizes are the same as a size of the data block interval S2, and the data block interval S2 belongs to the data block interval S1; the data block interval S2 includes multiple data block intervals whose sizes are the same as a size of the data block interval S3, the data block interval S3 belongs to the data block interval S2; the data block interval S3 includes multiple data blocks; the data block S4 belongs to the data block interval S1. If S4 has a corresponding line directory entry in the directory of the shared storage space, the line directory entry corresponding to S4 is used to describe an access type and a sharer of S4; if S4 has no corresponding line directory entry in the directory of the shared storage space, it is determined whether S3 has a corresponding directory entry in the directory entry of the shared storage space. If S3 has the corresponding directory entry in the directory entry of the shared storage space, the directory entry that is corresponding to S3 and is in the directory of the shared storage space is used to describe the access type and the sharer of S4; if S3 has no corresponding directory entry in the directory entry of the shared storage space, directory entries corresponding to the data block intervals are searched for in ascending order of granularity magnitudes of the data block intervals, and a directory entry that is first found is used to describe the access type and the sharer of S4.

In an embodiment of the present disclosure, the shared storage space may include multiple high-order data block intervals, one high-order data block interval may include multiple data block intervals, and one data block interval may include multiple data blocks. A high-order interval directory entry is used to describe an access type and a sharer of the high-order data block interval, an interval directory entry is used to describe an access type and a sharer of the data block interval, and a line directory entry is used to describe an access type and a sharer of the data block. FIG. 5 is a schematic structural diagram of a line directory entry, an interval directory entry, and a high-order interval directory entry according to an embodiment of the present disclosure. As shown in FIG. 5, the high-order interval directory entry may include an address label, a sharer list, a granularity mark, and a type mark, the interval directory entry may include an address label, a sharer list, a granularity mark, a type mark, and an offset, and the line directory entry may include an address label, a sharer list, a granularity mark, a type mark, and an offset. An address label is used to mark an address of the first data block in a high-order data block interval corresponding to a directory entry. A sharer list is used to record a sharer of a data block, a data block interval, or the high-order data block interval corresponding to the directory entry, where the sharer list of the line directory entry is used to record the sharer of the data block corresponding to the directory entry, the sharer list of the interval directory entry is used to record the sharer of the data block interval corresponding to the directory entry, and the sharer list of the high-order interval directory entry is used to record the sharer of the high-order data block interval corresponding to the directory entry. A granularity mark is used to identify a granularity of the directory entry, for example, 00 indicates the line directory entry, 01 indicates the interval directory entry, and 11 indicates the high-order interval directory entry. A type mark is used to identify a type of the directory entry. The high-order interval directory entry has no offset. The offset of the interval directory entry is used to record an offset that is of an address of a data block interval corresponding to the interval directory entry and that is relative to an address in the address label. The offset of the line directory entry is used to record an offset that is of an address of a data block corresponding to the line directory entry and that is relative to an address in the address label.

Certainly, the high-order interval directory entry, the interval directory entry, and the line directory entry may include no type mark field, and a quantity of sharers in the sharer list is used to describe an access type of a directory entry. If the quantity of sharers is 1, the directory entry is of a private type; if the quantity of sharers is greater than 1, the directory entry is of a sharing type.

In addition, a same data structure is used for directory entries of different types in the directory of the shared storage space, and granularity marks are used to distinguish the directory entries of different types. For example, an offset field may be added into a data structure of the high-order interval directory entry shown in FIG. 5, to maintain directory entry structure coherence. In this case, an offset of the high-order interval directory entry may be set to 0.

Optionally, in a specific implementation manner of this embodiment of the present disclosure, step 202 is further implemented as performing a directory entry combination operation on the second-type directory entry in the first directory entry according to the second-type directory entry in the first directory entry and the third-type directory entry in the first directory entry and according to an access type and a sharer, to form a third directory entry of the first-type storage space; and performing a combination operation on a third-type directory entry in the third directory entry according to the third-type directory entry in the third directory entry and a first-type directory entry in the third directory entry and according to an access type and a sharer, to form the second directory entry of the first-type storage space.

For example, it is assumed that a high-order data block interval 1 includes multiple data block intervals, one data block interval may include multiple data blocks, and directory entries in the directory of the shared storage space that are corresponding to all data blocks in the high-order data block interval 1 are recorded as a directory entry 1, that is, the first directory entry of the present disclosure. The directory entry 1 may include a high-order interval directory entry, an interval directory entry, or a line directory entry.

In a specific implementation manner of this embodiment of the present disclosure, first, high-order interval directory entries in the directory entries 1 of all data block intervals in the high-order data block interval 1 keep unchanged, and directory entry combination is performed on line directory entries according to interval directory entries and the line directory entries of all the data block intervals in the high-order data block interval 1 in the directory entry 1, and according to an access type and a sharer, to form a directory entry 2. The directory entry 2 is another directory entry description manner of all data blocks in the high-order data block interval 1. Then, a line directory entry in the directory entry 2 keeps unchanged, and directory entry combination is performed on an interval directory entry according to a high-order interval directory entry and the interval directory entry that are in the directory entry 2, and according to an access type and a sharer, to form a directory entry 3. The directory entry 3 obtained in this case is the second directory entry of the present disclosure.

Optionally, in another specific implementation manner of this embodiment of the present disclosure, step 202 is further implemented as performing a directory entry combination operation on the third-type directory entry in the first directory entry according to the third-type directory entry in the first directory entry and the first-type directory entry in the first directory entry and according to an access type and a sharer, to form a third directory entry of the first-type storage space; and performing a directory entry combination operation on a second-type directory entry in the third directory entry according to the second-type directory entry in the third directory entry and a third-type directory entry in the third directory entry and according to an access type and a sharer, to form the second directory entry of the first-type storage space.

The high-order data block interval 1 and the directory entry 1 are still used as an example. In a specific implementation manner of this embodiment of the present disclosure, first, the line directory entry in the directory entry 1 keeps unchanged, and a directory entry combination operation is performed on the interval directory entry according to the high-order interval directory entry and the interval directory entry that are in the directory entry 1, and according to an access type and a sharer, to form a directory entry 2. Then, a high-order interval directory entry in the directory entry 2 keeps unchanged, and directory entry combination is performed on line directory entries according to interval directory entries and the line directory entries in the directory entry 2 of all data block intervals in the high-order data block interval 1, and according to an access type and a sharer, to form a directory entry 3. The directory entry 3 obtained in this case is the second directory entry of the present disclosure.

Optionally, in this embodiment of the present disclosure, reference may also be made to the method in FIG. 2. The first-type directory entry and the third-type directory entry are first processed according to the method in FIG. 2, and then the third-type directory entry and the second-type directory entry are processed according to the method in FIG. 2.

The high-order data block interval 1 and the directory entry 1 are still used as an example. First, the high-order data block interval 1 may be used as the first-type storage space, and the data block interval may be used as the second-type storage space, to perform the method shown in FIG. 2. The high-order interval directory entry and the interval directory entry that are in the directory entry 1 are adjusted, and the line directory entry in the directory entry 1 is not adjusted. It should be understood that, in this case, the directory entry 2 may be the same as or different from the directory entry 1. If the directory entry 2 is different from the directory entry 1, a total record quantity of the directory entry 2 is less than that of the directory entry 1. Then, each data block interval in the high-order data block interval 1 is used as the first-type storage space, and a data block is used as the second-type storage space, to perform the method in FIG. 2. An interval directory entry and a line directory entry that are in the directory entry 2 are adjusted, and a high-order directory entry in the directory entry 2 is not adjusted.

Optionally, in this embodiment of the present disclosure, reference may also be made to the method in FIG. 2. The third-type directory entry and the second-type directory entry are first processed according to the method in FIG. 2, and then the first-type directory entry and the third-type directory entry are processed according to the method in FIG. 2.

The high-order data block interval 1 and the directory entry 1 are still used as an example. First, each data block interval in the high-order data block interval 1 may be used as the first-type storage space, and a data block may be used as the second-type storage space, to perform the method in FIG. 2. The interval directory entry and the line directory entry that are in the directory entry 1 are adjusted, and the high-order directory entry in the directory entry 1 is not adjusted. It should be understood that, in this case, the directory entry 2 may be the same as or different from the directory entry 1. If the directory entry 2 is different from the directory entry 1, a total record quantity of the directory entry 2 is less than that of the directory entry 1. Then, the high-order data block interval 1 is used as the first-type storage space, and the data block interval is used as the second-type storage space, to perform the method shown in FIG. 2. A high-order interval directory entry and an interval directory entry that are in the directory entry 2 are adjusted, and a line directory entry in the directory entry 2 is not adjusted.

Optionally, in an embodiment, the method may further include, when a first processor core in the multi-core processor system performs a write operation on a second-type storage space in the shared storage space, if there is no directory entry of the second-type storage space in the directory of the shared storage space, creating a first-type directory entry of the second-type storage space, where an access type of the first-type directory entry of the second-type storage space is the private type, and a sharer of the first-type directory entry of the second-type storage space is the first processor core. For example, when the first processor core performs a write operation on a first data block in the shared storage space, if there is no directory entry of the first data block in the directory of the shared storage space, an interval directory entry of the first data block is created, where an access type of the interval directory entry of the first data block is the private type, and a sharer of the interval directory entry of the first data block is the first processor core.

Optionally, in another embodiment, the method may further include, when a first processor core performs a write operation on a second-type storage space, if there is a first-type directory entry of the second-type storage space in the directory of the shared storage space, an access type of the first-type directory entry of the second-type storage space is the private type, and a sharer of the first-type directory entry of the second-type storage space is not the first processor core, creating a second-type directory entry of the second-type storage space in the first-type directory entry of the second-type storage space, where an access type of the second-type directory entry of the second-type storage space is the private type, and a sharer of the second-type directory entry of the second-type storage space is the first processor core. For example, when the first processor core performs a write operation on a first data block, if there is an interval directory entry of the first data block in the directory of the shared storage space, an access type of the interval directory entry of the first data block is the private type, and a sharer of the interval directory entry of the first data block is not the first processor core, a line directory entry of the first data block is created in the interval directory entry of the first data block, where an access type of the line directory entry of the first data block is the private type, and a sharer of the line directory entry of the first data block is the first processor core. In addition, if the sharer of the interval directory entry of the first data block is the first processor core, no operation is performed on the interval directory entry of the first data block. In addition, if there is further a high-order interval directory entry of the first data block in the directory of the shared storage space, a method thereof is the same as a method used when there is only the interval directory entry of the first data block.

Optionally, in still another embodiment, the method may further include, when a first processor core performs a write operation on a second-type storage space, if there is a first-type directory entry of the second-type storage space in the directory of the shared storage space, and an access type of the first-type directory entry of the second-type storage space is the sharing type, creating a second-type directory entry of the second-type storage space in the first-type directory entry of the second-type storage space, where an access type of the second-type directory entry of the second-type storage space is the private type, and a sharer of the second-type directory entry of the second-type storage space is the first processor core. For example, when the first processor core performs a write operation on a first data block, if there is an interval directory entry of the first data block in the directory of the shared storage space, and an access type of the interval directory entry of the first data block is the sharing type, a line directory entry of the first data block is created in the interval directory entry of the first data block, where an access type of the line directory entry of the first data block is the private type, and a sharer of the line directory entry of the first data block is the first processor core. In addition, if there is further a high-order interval directory entry of the first data block in the directory of the shared storage space, a method thereof is the same as a method used when there is only the interval directory entry of the first data block.

Optionally, in still another embodiment, the method may further include, when a first processor core performs a write operation on the second-type storage space, if there is a second-type directory entry of the second-type storage space in the directory of the shared storage space, an access type of the second-type directory entry of the second-type storage space is the private type, and a sharer of the second-type directory entry of the second-type storage space is not the first processor core, changing the sharer of the second-type directory entry of the second-type storage space to the first processor core. For example, when the first processor core performs a write operation on a first data block, if there is a line directory entry of the first data block in the directory of the shared storage space, an access type of the line directory entry of the first data block is the private type, and a sharer of the line directory entry of the first data block is not the first processor core, the sharer of the line directory entry of the first data block is changed to the first processor core. In addition, if the sharer of the line directory entry of the first data block is the first processor core, no operation is performed on the line directory entry of the first data block. In addition, if there is further an interval directory entry and/or a high-order interval directory entry of the first data block in the directory of the shared storage space, a method thereof is the same as a method used when there is only the line directory entry of the first data block.

Optionally, in still another embodiment, the method may further include, when a first processor core performs a write operation on the second-type storage space, if there is a second-type directory entry of the second-type storage space in the directory of the shared storage space, and an access type of the second-type directory entry of the second-type storage space is the sharing type, changing the access type of the second-type directory entry of the second-type storage space to the private type, and changing a sharer of the second-type directory entry of the second-type storage space to the first processor core. For example, when the first processor core performs a write operation on a first data block, if there is a line directory entry of the first data block in the directory of the shared storage space, and an access type of the line directory entry of the first data block is the sharing type, the access type of the line directory entry of the first data block is changed to the private type, and a sharer of the line directory entry of the first data block is changed to the first processor core. In addition, if there is further an interval directory entry and/or a high-order interval directory entry of the first data block in the directory of the shared storage space, a method thereof is the same as a method used when there is only the line directory entry of the first data block.

Optionally, in still another embodiment, the method may further include, when a first processor core performs a read operation on the second-type storage space in the shared storage space, if there is no directory entry of the second-type storage space in the directory of the shared storage space, creating a first-type directory entry of the second-type storage space, where an access type of the first-type directory entry of the second-type storage space is the private type, and a sharer of the first-type directory entry of the second-type storage space is the first processor core. For example, when the first processor core performs a read operation on a first data block in the shared storage space, if there is no directory entry of the first data block in the directory of the shared storage space, an interval directory entry of the first data block is created, where an access type of the interval directory entry of the first data block is the private type, and a sharer of the interval directory entry of the first data block is the first processor core.

Optionally, in still another embodiment, the method may further include, when a first processor core performs a read operation on the second-type storage space, if there is a first-type directory entry of the second-type storage space in the directory of the shared storage space, an access type of the first-type directory entry of the second-type storage space is the private type, and a sharer of the first-type directory entry of the second-type storage space is not the first processor core, creating a second-type directory entry of the second-type storage space in the first-type directory entry of the second-type storage space, where an access type of the second-type directory entry of the second-type storage space is the sharing type, and a sharer of the second-type directory entry of the second-type storage space is the first processor core. For example, when the first processor core performs a read operation on a first data block, if there is an interval directory entry of the first data block in the directory of the shared storage space, an access type of the interval directory entry of the first data block is the private type, and a sharer of the interval directory entry of the first data block is not the first processor core, a line directory entry of the first data block is created in the interval directory entry of the first data block, where an access type of the line directory entry of the first data block is the sharing type, and a sharer of the line directory entry of the first data block is the first processor core. In addition, if the sharer of the interval directory entry of the first data block is the first processor core, no operation is performed on the interval directory entry of the first data block. In addition, if there is further a high-order interval directory entry of the first data block in the directory of the shared storage space, a method thereof is the same as a method used when there is only the interval directory entry of the first data block.

Optionally, in still another embodiment, the method may further include, when a first processor core performs a read operation on the second-type storage space, if there is a first-type directory entry of the second-type storage space in the directory of the shared storage space, an access type of the first-type directory entry of the second-type storage space is the sharing type, and sharers of the first-type directory entry of the second-type storage space do not include the first processor core, adding the first processor core to the sharers of the first-type directory entry of the second-type storage space. For example, when the first processor core performs a read operation on a first data block, if there is an interval directory entry of the first data block in the directory of the shared storage space, an access type of the interval directory entry of the first data block is the sharing type, and sharers of the interval directory entry of the first data block do not include the first processor core, the first processor core is added into the sharers of the interval directory entry of the first data block. In addition, if there is further a high-order interval directory entry of the first data block in the directory of the shared storage space, a method thereof is the same as a method used when there is only the interval directory entry of the first data block.

Optionally, in still another embodiment, the method may further include, when a first processor core performs a read operation on the second-type storage space, if there is a second-type directory entry of the second-type storage space in the directory of the shared storage space, an access type of the second-type directory entry of the second-type storage space is the private type, and a sharer of the second-type directory entry of the second-type storage space is a second processor core, changing the access type of the second-type directory entry of the second-type storage space to the sharing type, and changing the sharer of the second-type directory entry of the second-type storage space to the first processor core and the second processor core. For example, when the first processor core performs a read operation on a first data block, if there is a line directory entry of the first data block in the directory of the shared storage space, an access type of the line directory entry of the first data block is the private type, and a sharer of the line directory entry of the first data block is the second processor core, the line directory entry of the first data block is changed to the sharing type, and the sharer of the line directory entry of the first data block is changed to the first processor core and the second processor core. In addition, if the sharer of the line directory entry of the first data block is the first processor core, no operation is performed on the line directory entry of the first data block. In addition, if there is further an interval directory entry and/or a high-order interval directory entry of the first data block in the directory of the shared storage space, a method thereof is the same as a method used when there is only the line directory entry of the first data block.

Optionally, in still another embodiment, the method may further include, when a first processor core performs a read operation on the second-type storage space, if there is a second-type directory entry of the second-type storage space in the directory of the shared storage space, an access type of the second-type directory entry of the second-type storage space is the sharing type, and sharers of the second-type directory entry of the second-type storage space do not include the first processor core, adding the first processor core to the sharers of the second-type directory entry of the second-type storage space. For example, when the first processor core performs a read operation on a first data block, if there is a line directory entry of the first data block in the directory of the shared storage space, an access type of the line directory entry of the first data block is the sharing type, and sharers of the line directory entry of the first data block do not include the first processor core, the first processor core is added into the sharers of the line directory entry of the first data block. In addition, if there is further an interval directory entry and/or a high-order interval directory entry of the first data block in the directory of the shared storage space, a method thereof is the same as a method used when there is only the line directory entry of the first data block.

Figure 6:
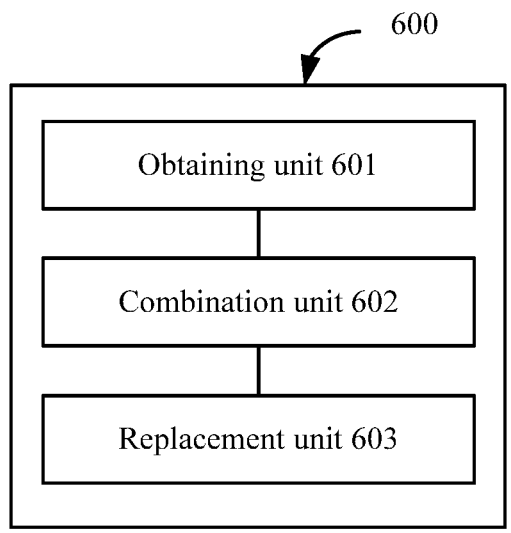
FIG. 6 is a schematic structural diagram of a directory controller according to an embodiment of the present disclosure.

FIG. 6 is a schematic structural diagram of a directory controller 600 according to an embodiment of the present disclosure. The directory controller 600 may include an obtaining unit 601, a combination unit 602, and a replacement unit 603.

The obtaining unit 601 is configured to obtain a first directory entry that is corresponding to a first-type storage space in a shared storage space of a multi-core processor system and that is in a directory of the shared storage space.

The first-type storage space includes multiple second-type storage spaces, and the first directory entry includes a second-type directory entry or includes a second-type directory entry and a first-type directory entry, where the first-type directory entry is used to describe an access type and a sharer of the first-type storage space corresponding to the first-type directory entry, the second-type storage space is used to describe an access type and a sharer of the second-type storage space corresponding to the second-type directory entry, one first-type directory entry is one directory entry record in the directory of the shared storage space, and one second-type directory entry is one directory entry record in the directory of the shared storage space.

It should be understood that the shared storage space in this embodiment of the present disclosure is storage space shared by multiple processor cores in the multi-core processor system, and, may be a cache in the multi-core processor system.

It should be understood that, in this embodiment of the present disclosure, both the first-type storage space and the second-type storage space are a type of granularity space that is used to divide the shared storage space in the multi-core processor system. The first-type storage space includes multiple consecutive second-type storage spaces, and all first-type storage spaces have second-type storage space of a same quantity. In this embodiment of the present disclosure, a data block is space, obtained after the shared storage space is divided, of a minimum granularity.

It should be understood that when a second-type storage space has both the first-type directory entry and the second-type directory entry, the second-type directory entry corresponding to the second-type storage space is used to describe an access type and a sharer of the second-type storage space. It should be understood that, that a second-type storage space has both the first-type directory entry and the second-type directory entry means that in the directory of the shared storage space, there are both the second-type directory entry corresponding to the second-type storage space and the first-type directory entry corresponding to the first-type storage space in which the second-type storage space is located.

It should be understood that a sharer of storage space is a processor core that is in the multi-core processor system and that accesses the storage space.

It should be understood that an access type of the storage space includes a sharing type and a private type. The sharing type means that the storage space is simultaneously accessed by multiple sharers, and the private type means that the storage space is accessed by a single sharer.

The combination unit 602 is configured to perform a directory entry combination operation on the first directory entry according to each directory entry in the first directory entry and according to an access type and a sharer, to form a second directory entry of the first-type storage space.

The replacement unit 603 is configured to, when a record quantity of the second directory entry is less than a record quantity of the first directory entry, replace the first directory entry with the second directory entry, and use the second directory entry as a directory entry that is corresponding to the first-type storage space and that is in the directory of the shared storage space.

In this embodiment of the present disclosure, the directory controller 600 combines directory entries of a data block interval according to an access type and a sharer, and replaces, when a record quantity of directory entries obtained after the combination is less than a record quantity of directory entries before the combination, the directory entries before the combination with the directory entries obtained after the combination, such that utilization of on-chip storage space of a directory can be improved to some extent while a sharing status of a data block is correctly indicated.

It should be understood that, in this embodiment of the present disclosure, the first-type storage space is corresponding to the first-type directory entry, and the second-type storage space is corresponding to the second-type directory entry. The only difference between the first-type storage space and the second-type storage space is a difference in storage space sizes, and one first-type storage space may be divided into multiple second-type storage spaces. For example, in this embodiment of the present disclosure, the first-type storage space may be a data block interval that may include multiple consecutive data blocks, and the second-type storage space may be a data block. In this case, the first-type directory entry is an interval directory entry and the second-type directory entry is a line directory entry. The data block is minimum storage space accessed by a processor core.

It should be understood that, in actual application, the directory controller and a memory controller may be integrated as one device, or a memory controller can complete work of the directory controller, and the memory controller directly performs a read or write operation on a directory. The memory controller in this case also falls within a protection scope of the directory controller in the present disclosure.

Preferably, a same data structure is used for directory entries of different types in the directory of the shared storage space, and granularity marks are used to distinguish the directory entries of different types. For example, a same data structure may be used for the first-type directory entry and the second-type directory entry, and granularity marks are used to identify directory entries of different types, or a granularity mark is used to identify a size of storage space described by a directory entry.

Optionally, in an embodiment, the combination unit 602 is configured to combine multiple second-type directory entries in the first directory entry according to the first-type directory entry in the first directory entry and the second-type directory entry in the first directory entry, to form a first-type directory entry in the second directory entry; and form a second-type directory entry in the second directory entry according to the first-type directory entry in the first directory entry, the second-type directory entry in the first directory entry, and the first-type directory entry in the second directory entry, where access types described by the multiple second-type directory entries in the first directory entry are all a sharing type, an access type described by the first-type directory entry in the second directory entry is a sharing type, and sharers described by the first-type directory entry in the second directory entry are sharers to which the multiple second-type directory entries in the first directory entry relate.

Optionally, in another embodiment, the combination unit 602 is configured to combine multiple second-type directory entries in the first directory entry according to the first-type directory entry in the first directory entry and the second-type directory entry in the first directory entry, to form a first-type directory entry in the second directory entry; and form a second-type directory entry in the second directory entry according to the first-type directory entry in the first directory entry, the second-type directory entry in the first directory entry, and the first-type directory entry in the second directory entry, where access types described by the multiple second-type directory entries in the first directory entry are all a private type and the multiple second-type directory entries have a same sharer, an access type described by the first-type directory entry in the second directory entry is a private type, and a sharer described by the first-type directory entry in the second directory entry is the sharer of the multiple second-type directory entries in the first directory entry.

Optionally, the first-type storage space includes multiple third-type storage spaces, the third-type storage space includes multiple second-type storage spaces, the first directory entry further includes a third-type directory entry, and the third-type directory entry is used to describe an access type and a sharer of the third-type storage space corresponding to the third-type directory entry.

It should be understood that, in this embodiment of the present disclosure, all first-type storage spaces include third-type storage space of a same quantity, and all third-type storage spaces include second-type storage space of a same quantity.

When a second-type storage space has the first-type directory entry, the second-type directory entry, and the third-type directory entry, the second-type directory entry corresponding to the second-type storage space is used to describe an access type and a sharer of the second-type storage space.

In an embodiment of the present disclosure, when the first-type storage space includes multiple third-type storage spaces, the third-type storage space includes multiple second-type storage spaces, and the first directory entry further includes a third-type directory entry, the combination unit 602 is configured to perform a directory entry combination operation on the second-type directory entry in the first directory entry according to the second-type directory entry in the first directory entry and the third-type directory entry in the first directory entry and according to an access type and a sharer, to form a third directory entry of the first-type storage space; and perform a combination operation on a third-type directory entry in the third directory entry according to the third-type directory entry in the third directory entry and a first-type directory entry in the third directory entry and according to an access type and a sharer, to form the second directory entry of the first-type storage space.

In another embodiment of the present disclosure, when the first-type storage space includes multiple third-type storage spaces, the third-type storage space includes multiple second-type storage spaces, and the first directory entry further includes a third-type directory entry, the combination unit 602 is configured to perform a directory entry combination operation on the third-type directory entry in the first directory entry according to the third-type directory entry in the first directory entry and the first-type directory entry in the first directory entry and according to an access type and a sharer, to form a third directory entry of the first-type storage space; and perform a directory entry combination operation on a second-type directory entry in the third directory entry according to the second-type directory entry in the third directory entry and a third-type directory entry in the third directory entry and according to an access type and a sharer, to form the second directory entry of the first-type storage space.

In addition, the directory controller 600 may further perform the method in FIG. 2, and implement functions of the directory controller shown in FIG. 2, which is not described herein in this embodiment of the present disclosure.

Figure 7:
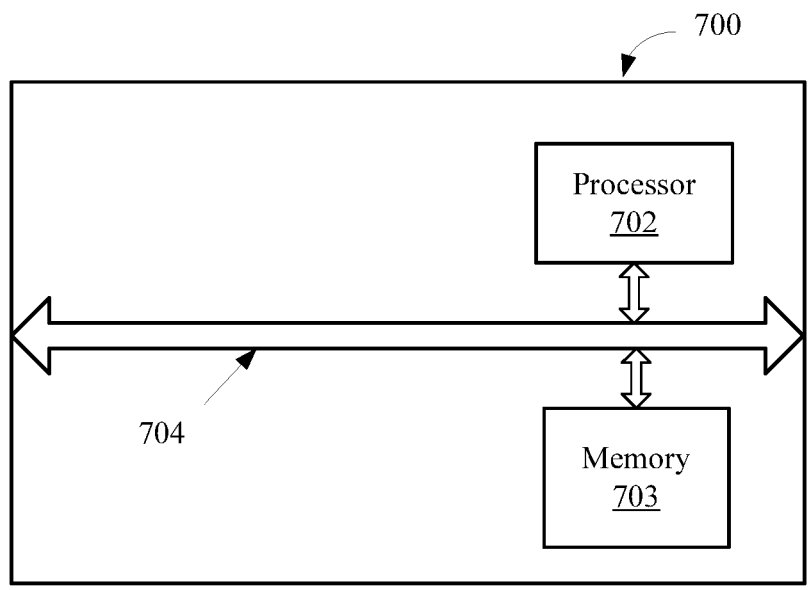
FIG. 7 is another schematic structural diagram of a directory controller according to an embodiment of the present disclosure.

FIG. 7 is a schematic structural diagram of a directory controller 700 according to an embodiment of the present disclosure. The directory controller 700 may include a processor 702, a memory 703, and a bus 704. The processor 702 and the memory 703 are connected to each other using a bus system 704. The bus 704 may be an Industry Standard Architecture (ISA) bus, a Peripheral Component Interconnect (PCI) bus, an Extended Industry Standard Architecture (EISA) bus, or the like. The bus may be classified into an address bus, a data bus, a control bus, and the like. For ease of denotation, the bus is denoted using only one double-headed arrow in FIG. 7. However, it does not indicate that there is only one bus or only one type of buses.

The memory 703 is configured to store a program. The program may include program code, where the program code includes a computer operation instruction. The memory 703 may include a read-only memory and a random access memory, and provide an instruction and data to the processor 702. The memory 703 may include a high-speed random-access memory (RAM), and may also include a nonvolatile memory such as at least one magnetic disk storage.

The processor 702 is configured to execute the program stored in the memory 703 and is configured to obtain a first directory entry that is corresponding to first-type storage space in shared storage space of a multi-core processor system and that is in a directory of the shared storage space, where the first-type storage space includes multiple second-type storage spaces, and the first directory entry includes a second-type directory entry or includes a second-type directory entry and a first-type directory entry, where the first-type directory entry is used to describe an access type and a sharer of the first-type storage space corresponding to the first-type directory entry, the second-type directory entry is used to describe an access type and a sharer of the second-type storage space corresponding to the second-type directory entry, one first-type directory entry is one directory entry record in the directory of the shared storage space, and one second-type directory entry is one directory entry record in the directory of the shared storage space; perform a directory entry combination operation on the first directory entry according to each directory entry in the first directory entry and according to an access type and a sharer, to form a second directory entry of the first-type storage space; and when a record quantity of the second directory entry is less than a record quantity of the first directory entry, replace the first directory entry with the second directory entry, and use the second directory entry as a directory entry that is corresponding to the first-type storage space and that is in the directory of the shared storage space.

It should be understood that the shared storage space in this embodiment of the present disclosure is storage space shared by multiple processor cores in the multi-core processor system, and, may be a cache in the multi-core processor system.

It should be understood that, in this embodiment of the present disclosure, both the first-type storage space and the second-type storage space are a type of granularity space that is used to divide the shared storage space in the multi-core processor system. The first-type storage space includes multiple consecutive second-type storage spaces, and all first-type storage spaces have second-type storage space of a same quantity. In this embodiment of the present disclosure, a data block is space, obtained after the shared storage space is divided, of a minimum granularity.

It should be understood that when a second-type storage space has both the first-type directory entry and the second-type directory entry, the second-type directory entry corresponding to the second-type storage space is used to describe an access type and a sharer of the second-type storage space. It should be understood that, that a second-type storage space has both the first-type directory entry and the second-type directory entry means that in the directory of the shared storage space, there are both the second-type directory entry corresponding to the second-type storage space and the first-type directory entry corresponding to the first-type storage space in which the second-type storage space is located.

It should be understood that a sharer of storage space is a processor core that is in the multi-core processor system and that accesses the storage space.

It should be understood that an access type of the storage space includes a sharing type and a private type. The sharing type means that the storage space is simultaneously accessed by multiple sharers, and the private type means that the storage space is accessed by a single sharer.

The foregoing method that is performed by the directory controller and that is disclosed in the embodiment shown in FIG. 2 may be applied to the processor 702 or implemented by the processor 702. The processor 702 may be an integrated circuit chip and have a signal processing capability. In an implementation process, the steps in the foregoing method may be completed by means of an integrated logic circuit of hardware in the processor 702 or an instruction in a form of software. The foregoing processor 702 may be a general purpose processor, including a CPU, a network processor (NP), and the like, or may be a digital signal processor (DSP), an application-specific integrated circuit (ASIC), a field programmable gate array (FPGA), or another programmable logic device, discrete gate or transistor logic device, or discrete hardware component. The processor 702 may implement or execute all methods, steps and logical block diagrams disclosed in the embodiments of the present disclosure. The general purpose processor may be a microprocessor or the processor may be any conventional processor and the like. Steps of the methods disclosed with reference to the embodiments of the present disclosure may be directly executed and completed by means of a hardware decoding processor, or may be executed and completed using a combination of hardware and software modules in a decoding processor. The software module may be located in a mature storage medium in the field, such as a random access memory, a flash memory, a read-only memory, a programmable read-only memory, an electrically-erasable programmable memory, or a register. The storage medium is located in the memory 703, and the processor 702 reads information in the memory 703 and completes the steps in the foregoing methods in combination with hardware of the processor 702.

In this embodiment of the present disclosure, the directory controller 700 combines directory entries of a data block interval according to an access type and a sharer, and replaces, when a record quantity of directory entries obtained after the combination is less than a record quantity of directory entries before the combination, the directory entries before the combination with the directory entries obtained after the combination, such that utilization of on-chip storage space of a directory can be improved to some extent while a sharing status of a data block is correctly indicated.

The memory controller in this case also falls within a protection scope of the directory controller in the present disclosure.

It should be understood that, in this embodiment of the present disclosure, the first-type storage space is corresponding to the first-type directory entry, and the second-type storage space is corresponding to the second-type directory entry. The only difference between the first-type storage space and the second-type storage space is a difference in storage space sizes, and one first-type storage space may be divided into multiple second-type storage spaces. For example, in this embodiment of the present disclosure, the first-type storage space may be a data block interval that may include multiple consecutive data blocks, and the second-type storage space may be a data block. In this case, the first-type directory entry is an interval directory entry and the second-type directory entry is a line directory entry. The data block is minimum storage space accessed by a processor core.

It should be understood that, in actual application, the directory controller and a memory controller may be integrated as one device, or a memory controller can complete work of the directory controller, and the memory controller directly performs a read or write operation on a directory. The memory controller in this case also falls within a protection scope of the directory controller in the present disclosure.

Preferably, a same data structure is used for directory entries of different types in the directory of the shared storage space, and granularity marks are used to distinguish the directory entries of different types. For example, a same data structure may be used for the first-type directory entry and the second-type directory entry, and granularity marks are used to identify directory entries of different types, or a granularity mark is used to identify a size of storage space described by a directory entry.

Optionally, in an embodiment, in a process of performing a directory entry combination operation on the first directory entry according to each directory entry in the first directory entry and according to an access type and a sharer, to form a second directory entry of the first-type storage space, the processor 702 is configured to combine multiple second-type directory entries in the first directory entry according to the first-type directory entry in the first directory entry and the second-type directory entry in the first directory entry, to form a first-type directory entry in the second directory entry; and form a second-type directory entry in the second directory entry according to the first-type directory entry in the first directory entry, the second-type directory entry in the first directory entry, and the first-type directory entry in the second directory entry, where access types described by the multiple second-type directory entries in the first directory entry are all a sharing type, an access type described by the first-type directory entry in the second directory entry is a sharing type, and sharers described by the first-type directory entry in the second directory entry are sharers to which the multiple second-type directory entries in the first directory entry relate.

Optionally, in another embodiment, in a process of performing a directory entry combination operation on the first directory entry according to each directory entry in the first directory entry and according to an access type and a sharer, to form a second directory entry of the first-type storage space, the processor 702 is configured to combine multiple second-type directory entries in the first directory entry according to the first-type directory entry in the first directory entry and the second-type directory entry in the first directory entry, to form a first-type directory entry in the second directory entry; and form a second-type directory entry in the second directory entry according to the first-type directory entry in the first directory entry, the second-type directory entry in the first directory entry, and the first-type directory entry in the second directory entry, where access types described by the multiple second-type directory entries in the first directory entry are all a private type and the multiple second-type directory entries have a same sharer, an access type described by the first-type directory entry in the second directory entry is a private type, and a sharer described by the first-type directory entry in the second directory entry is the sharer of the multiple second-type directory entries in the first directory entry.

Optionally, the first-type storage space includes multiple third-type storage spaces, the third-type storage space includes multiple second-type storage spaces, the first directory entry further includes a third-type directory entry, and the third-type directory entry is used to describe an access type and a sharer of the third-type storage space corresponding to the third-type directory entry.

It should be understood that, in this embodiment of the present disclosure, all first-type storage spaces include third-type storage space of a same quantity, and all third-type storage spaces include second-type storage space of a same quantity.

When a second-type storage space has the first-type directory entry, the second-type directory entry, and the third-type directory entry, the second-type directory entry corresponding to the second-type storage space is used to describe an access type and a sharer of the second-type storage space.

In an embodiment of the present disclosure, when the first-type storage space includes multiple third-type storage spaces, the third-type storage space includes multiple second-type storage spaces, and the first directory entry further includes a third-type directory entry, in a process of performing a directory entry combination operation on the first directory entry according to each directory entry in the first directory entry and according to an access type and a sharer, to form a second directory entry of the first-type storage space, the processor 702 is configured to perform a directory entry combination operation on the second-type directory entry in the first directory entry according to the second-type directory entry in the first directory entry and the third-type directory entry in the first directory entry and according to an access type and a sharer, to form a third directory entry of the first-type storage space; and perform a combination operation on a third-type directory entry in the third directory entry according to the third-type directory entry in the third directory entry and a first-type directory entry in the third directory entry and according to an access type and a sharer, to form the second directory entry of the first-type storage space.

In another embodiment of the present disclosure, when the first-type storage space includes multiple third-type storage spaces, the third-type storage space includes multiple second-type storage spaces, and the first directory entry further includes a third-type directory entry, in a process of performing a directory entry combination operation on the first directory entry according to each directory entry in the first directory entry and according to an access type and a sharer, to form a second directory entry of the first-type storage space, the processor 702 is configured to perform a directory entry combination operation on the third-type directory entry in the first directory entry according to the third-type directory entry in the first directory entry and the first-type directory entry in the first directory entry and according to an access type and a sharer, to form a third directory entry of the first-type storage space; and perform a directory entry combination operation on a second-type directory entry in the third directory entry according to the second-type directory entry in the third directory entry and a third-type directory entry in the third directory entry and according to an access type and a sharer, to form the second directory entry of the first-type storage space.

In addition, the directory controller 700 may further perform the method in FIG. 2, and implement functions of the directory controller shown in FIG. 2, which is not described herein in this embodiment of the present disclosure.

It should be understood that sequence numbers of the foregoing processes do not mean execution sequences in various embodiments of the present disclosure. The execution sequences of the processes should be determined according to functions and internal logic of the processes, and should not be construed as any limitation on the implementation processes of the embodiments of the present disclosure.

Persons of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. The persons skilled in the art may use different methods to implement the described functions for each particular application, but it should not be considered that the implementation goes beyond the scope of the present disclosure.

It may be clearly understood by the persons skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of the present disclosure. The foregoing storage medium includes any medium that can store program code, such as a universal serial bus (USB) flash drive, a removable hard disk, a read-only memory (ROM), a RAM, a magnetic disk, or an optical disc.

The foregoing descriptions are merely specific implementation manners of the present disclosure, but are not intended to limit the protection scope of the present disclosure. Any variation or replacement readily figured out by the persons skilled in the art within the technical scope disclosed in the present disclosure shall fall within the protection scope of the present disclosure. Therefore, the protection scope of the present disclosure shall be subject to the protection scope of the claims.

What is claimed is:

1. A cache directory processing method, wherein the method comprises:
    obtaining a first directory corresponding to a first-type storage space in shared storage space for a plurality of cores in a multi-core processor system, the first-type storage space comprising a plurality of second-type storage spaces, the first directory comprising a plurality of second-type directory entries each corresponding to one of the plurality of second-type storage spaces, and each of the plurality of second-type directory entries describing an access type and a sharer of the one of the plurality of second-type storage spaces;
    performing a directory entry combination operation on the plurality of second-type directory entries in the first directory according to the access type and the sharer of each of the plurality of second-type directory entries to form a first-type directory entry in a second directory corresponding to the first-type storage space; and
    replacing the first directory with the second directory when a quantity of directory entries in the second directory is less than a quantity of directory entries in the first directory.

2. The method of claim 1, wherein the first-type directory entry describes an access type and sharers of the first-type storage space the access type in each of the plurality of second-type directory entries and described by the first-type directory entry being a sharing type, and the sharers described by the first-type directory entry being sharers to which the plurality of second-type directory entries relate.

3. The method of claim 1, wherein the first-type directory entry describes an access type and a sharer of the first-type storage space, the access type in the first-type directory entry being a private type, the sharer in the first-type directory entry and a sharer in each of the plurality of second-type directory entries being common, the access type in each of the plurality of second-type directory entries being a private type and the sharer in each of the plurality of second-type directory entries being common.

4. The method of claim 1, wherein the first-type storage space comprises a plurality of third-type storage spaces, wherein each of the plurality of third-type storage spaces comprises a plurality of second-type storage spaces, and wherein the performing the directory entry combination operation comprises:
    performing the directory entry combination operation on two or more of the plurality of the second-type directory entries in the first directory according to an access type and a sharer in each of the two or more of the plurality of second-type directory entries to form a third-type directory entry corresponding to one of the plurality of third-type storage spaces, the third-type directory entry describing an access type and a sharer of the third-type storage space corresponding to the third-type directory entry; and performing a combination operation on a plurality of third-type directory entries including the third-type directory entry according to an access type and a sharer in the plurality of third-type directory entries to form the first-type directory entry in the second directory of the first-type storage space.

5. The method of claim 1, wherein data structures of directory entries of different types in the first directory are the same, and wherein granularity marks distinguish the directory entries of different types.

6. The method of claim 1, wherein each of the plurality of second-type storage spaces is a data block, wherein the data block is a minimum storage space, and wherein the second-type directory entry is a line directory entry describing an access type and a sharer of a data block corresponding to the line directory entry.

7. A directory controller comprising:
a memory configured to store instructions; and
a processor coupled to the memory and configured to execute the instructions to:
obtain a first directory corresponding to a first-type storage space in shared storage space for a plurality of cores in a multi-core processor system, the first-type storage space comprising a plurality of second-type storage spaces, the first directory comprising a plurality of second-type directory entries each corresponding to one of the plurality of second-type storage spaces, and each of the plurality of second-type directory entries describing an access type and a sharer of the one of the plurality of second-type storage spaces;
perform a directory entry combination operation on the plurality of second-type directory entries in the first directory according to the access type and the sharer of each of the plurality of second-type directory entries to form a first-type directory entry in a second directory corresponding to the first-type storage space; and
replace the first directory with the second directory when a quantity of directory entries in the second directory is less than a quantity of directory entries in the first directory.

8. The directory controller of claim 7, wherein the first-type directory entry describes an access type and sharers of the first-type storage space the access type in each of the plurality of second-type directory entries and described by the first-type directory entry being a sharing type, and the sharers described by the first-type directory entry being sharers to which the plurality of second-type directory entries relate.

9. The directory controller of claim 7, wherein the first-type directory entry describes an access type and a sharer of the first-type storage space, the access type in the first-type directory entry being a private type, the sharer in the first-type directory entry and a sharer in each of the plurality of second-type directory entries being common, the access type in each of the plurality of second-type directory entries being a private type, and the sharer in each of the plurality of second-type directory entries being common.

10. The directory controller of claim 7, wherein the first-type storage space comprises a plurality of third-type storage spaces, wherein each of the plurality of third-type storage spaces comprises a plurality of second-type storage spaces, and wherein the processor is further configured to:
perform a directory entry combination operation on two or more of the plurality of the second-type directory entries in the first directory according to an access type and a sharer in each of the two or more of the plurality of second-type directory entries to form a third-type directory entry corresponding to one of the plurality of third-type storage spaces, the third-type directory entry describing an access type and a sharer of the third-type storage space corresponding to the third-type directory entry; and
perform a combination operation on a plurality of third-type directory entries including the third-type directory entry according to an access type and a sharer in the plurality of third-type directory entries to form the first-type directory entry in the second directory of the first-type storage space.

11. The directory controller of claim 7, wherein data structures of directory entries of different types in the first directory are the same, and wherein granularity marks distinguish the directory entries of different types.

12. The directory controller of claim 7, wherein each of the plurality of second-type storage spaces is a data block, wherein the data block is a minimum storage space, and wherein the second-type directory entry is a line directory entry describing an access type and a sharer of a data block corresponding to the line directory entry.

13. A multi-core processor system, comprising:
a multi-core processor comprising a plurality of cores; and
a directory controller coupled to the multi-core processor and configured to:
obtain a first directory corresponding to a first-type storage space in shared storage space for the plurality of cores, the first-type storage space comprising a plurality of second-type storage spaces, the first directory comprising a plurality of second-type directory entries each corresponding to one of the plurality of second-type storage spaces, each of the plurality of second-type directory entries describing an access type and a sharer of the one of the plurality of second-type storage spaces;
perform a directory entry combination operation on the plurality of second-type directory entries in the first directory according to the access type and the sharer of each of the plurality of second-type directory entries to form a first-type directory entry in a second directory of corresponding to the first-type storage space; and
replace the first directory with the second directory when a quantity of directory entries in the second directory is less than a quantity of directory entries in the first directory.

14. The system according to claim of claim 13, wherein the first-type directory entry describes an access type and sharers of the first-type storage space, the access type in each of the plurality of second-type directory entries and described by the first-type directory entry being a sharing type, and the sharers described by the first-type directory entry being sharers to which the plurality of second-type directory entries relate.

15. The system of claim 13, wherein the first-type directory entry describes an access type and a sharer of the first-type storage space, the access type in the first-type directory entry being a private type, the sharer in the first-type directory entry and a sharer in each of the plurality of second-type directory entries being common, the access type in each of the plurality of second-type directory entries being a private type, and the sharer in each of the plurality of second-type directory entries being common.

16. The system of claim 13, wherein the first-type storage space comprises a plurality of third-type storage spaces, wherein each of the plurality of third-type storage spaces comprises a plurality of second-type storage spaces, and wherein the directory controller is further configured to:
  perform a directory entry combination operation on two or more of the plurality of the second-type directory entries in the first directory according to an access type and a sharer in each of the two or more of the plurality of second-type directory entries to form a third-type directory entry corresponding to one of the plurality of third-type storage spaces, the third-type directory entry describing an access type and a sharer of the third-type storage space corresponding to the third-type directory entry; and
  perform a combination operation on a plurality of third-type directory entries including the third-type directory entry according to an access type and a sharer in the plurality of third-type directory entries to form the first-type directory entry in the second directory of the first-type storage space.

17. The system of claim 13, wherein directory entries of different types in the first directory are the same, and wherein granularity marks distinguish the directory entries of different types.

18. The system of claim 13, wherein each of the plurality of second-type storage spaces is a data block, wherein the data block is a minimum storage space, and wherein the second-type directory entry is a line directory entry describing an access type and a sharer of a data block corresponding to the line directory entry.

* * * * *

UNITED STATES PATENT AND TRADEMARK OFFICE
CERTIFICATE OF CORRECTION

PATENT NO. : 10,216,634 B2  
APPLICATION NO. : 15/472724  
DATED : February 26, 2019  
INVENTOR(S) : Michael Huang and Tongtong Cao Page 1 of 1

It is certified that error appears in the above-identified patent and that said Letters Patent is hereby corrected as shown below:

In the Claims

Column 32, Claim 14, Line 51 should read:
The system of claim 13, wherein the first-type directory entry describes an access type and sharers of the first-type storage space, the access type in each of the plurality of second-type directory entries and described by the first-type directory entry being a sharing type, and the sharers described by the first-type directory entry being sharers to which the plurality of second-type directory entries relate.

Signed and Sealed this  
Eleventh Day of June, 2019

Andrei Iancu  
*Director of the United States Patent and Trademark Office*